April 25, 1933.   J. B. WHITTED   1,905,257
THERMOSTAT RADIATOR SHUTTER CONTROL
Filed July 25, 1931    2 Sheets-Sheet 1
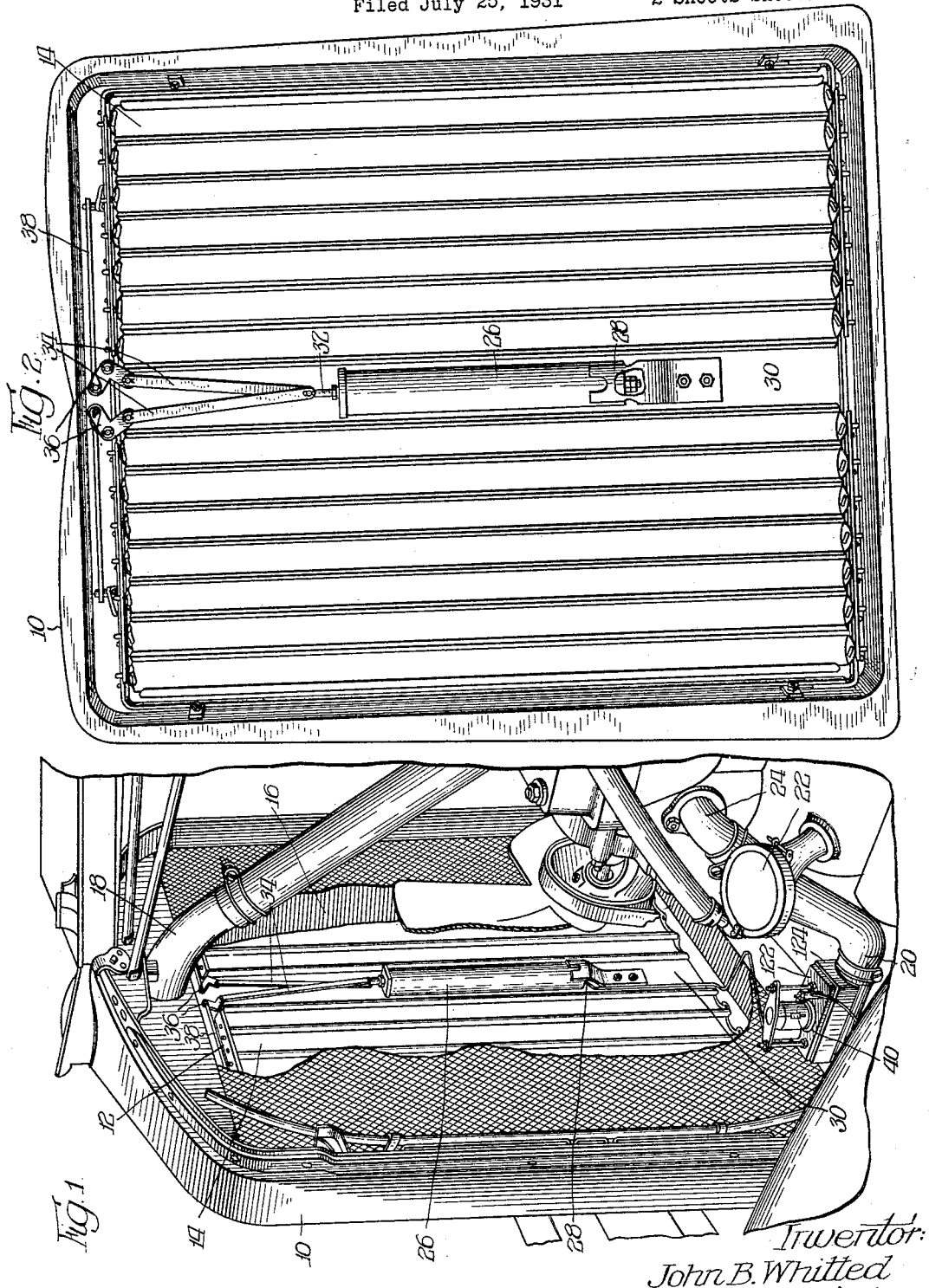
Inventor:
John B. Whitted
By Wilkinson Huxley Byron & Knight
Attys April 25, 1933.  J. B. WHITTED  1,905,257
THERMOSTAT RADIATOR SHUTTER CONTROL
Filed July 25, 1931   2 Sheets-Sheet 2
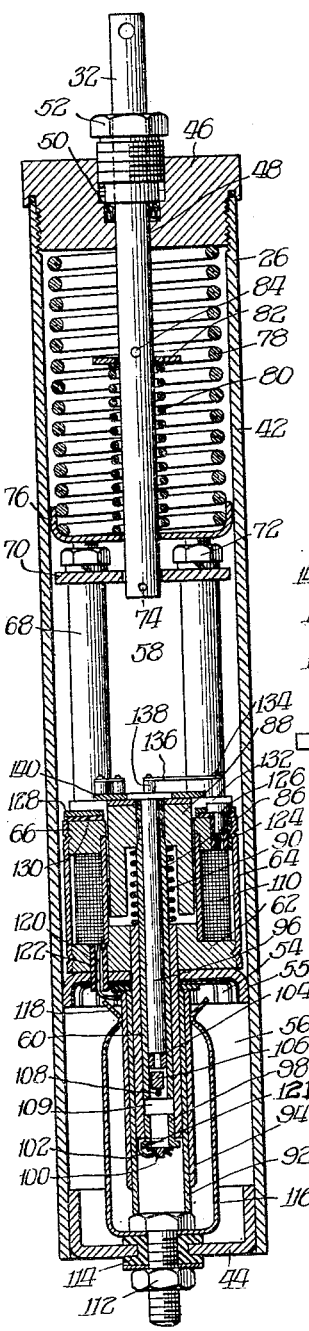
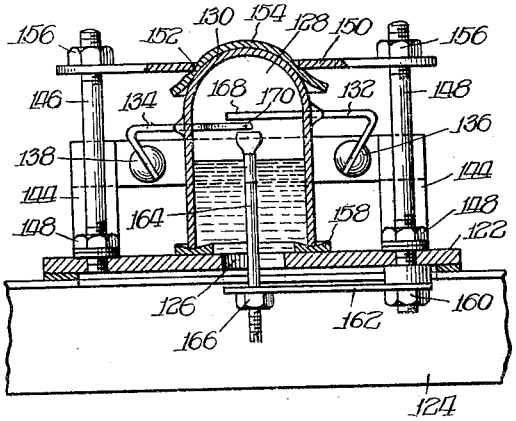
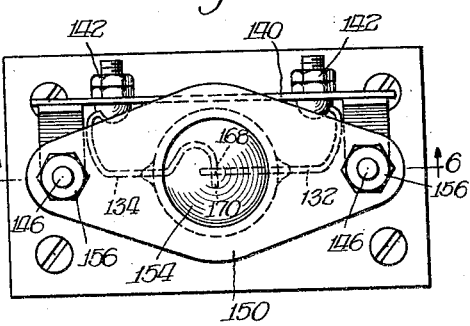
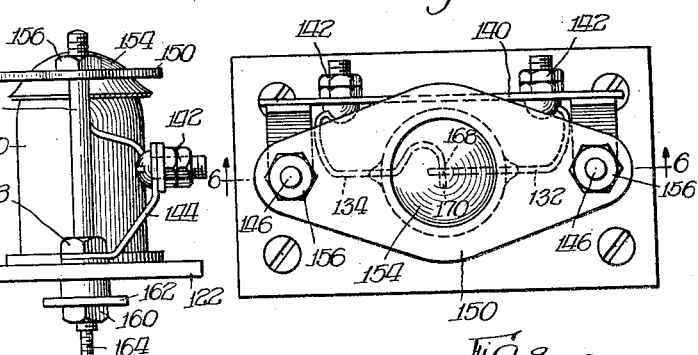
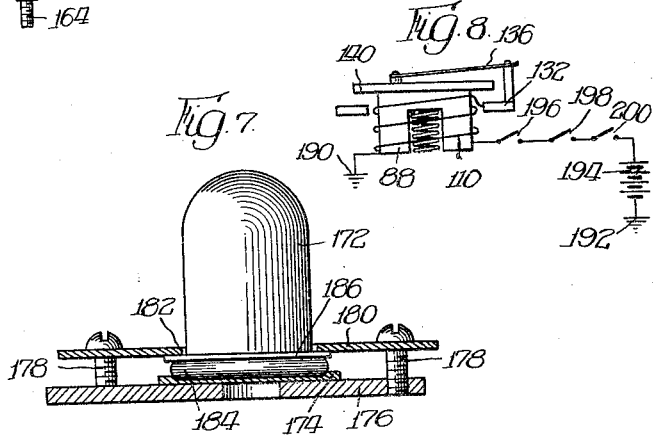
Inventor:
John B. Whitted,
By William Huxley Byron + Knight
Attys.

Patented Apr. 25, 1933

1,905,257

UNITED STATES PATENT OFFICE

JOHN B. WHITTED, OF CHICAGO, ILLINOIS, ASSIGNOR TO STEWART-WARNER CORPORATION, OF CHICAGO, ILLINOIS, A CORPORATION OF VIRGINIA

THERMOSTAT RADIATOR SHUTTER CONTROL

Application filed July 25, 1931. Serial No. 553,219.

This invention relates to improvements in a thermostatically-controlled radiator shutter device for motor vehicles and particularly to a system in which the operation of a thermostatically operable switch, in accordance with temperature conditions in the cooling system of a motor vehicle, initiates the actuation of pumping means to move the radiator shutter to its proper position by fluid pressure.

It is broadly a purpose of the present invention to provide means operative to produce a gradual movement of the radiator shutter in both directions and in which the movement in one direction is automatic and the movement in the opposite direction thermostatically controlled by the temperature of the cooling system. For example, the system may be so arranged that heating of the cooling system causes an opening movement of the shutter and when the temperature of the cooling system lowers, the shutter will be automatically returned to normal closed position.

It is an object of the invention to provide a housing containing a movable plunger connected to operate the radiator shutter and to provide electrically operable fluid pumping means within the housing operative to move the plunger in one direction against the action of resilient means which produces the return movement thereof.

It is a further object of the invention to provide an improved construction of a thermostatically operable switch for controlling an electrical circuit which will actuate the radiator shutters. According to the preferred form of the thermostat device, I provide a sealed chamber in communication with the cooling system in such a manner that the fluid in the cooling system will rise in the chamber up to a level determined by the compression of air trapped in the top of the chamber. Contact members extend into the top of the chamber above the fluid level and may be biased to either normally open or closed position. A thermostatic element is supported to extend into the chamber and is submerged in the cooling fluid so that upon expansion of the thermostatic element it will produce either opening or closing of the contacts dependent upon the normal positions thereof.

In the drawings—

Figure 1 is a partial perspective view of the front end of a motor vehicle illustrating the cooling system and radiator shutter control.

Figure 2 is an elevation of the radiator shutter frame and the operating means therefor.

Figure 3 is a longitudinal section through the housing containing the operating means for the radiator shutter.

Figure 4 is a plan view of the thermostat unit.

Figure 5 is a side view thereof.

Figure 6 is a vertical section taken on the plane indicated 6—6 in Figure 4.

Figure 7 is a partial vertical section illustrating a modified construction.

Figure 8 is a circuit diagram.

Referring to Figure 1, I show a radiator 10 at the front end of a motor vehicle, including a frame 12 pivotally supporting on vertical axes a plurality of shutter vanes 14. The radiator core 16 has an inlet connection 18 and an outlet connection 20 at the bottom of the core which is in communication with a pump 22 which delivers the cooling fluid through a pipe connection 24 to the engine. A shutter operating unit 26 is supported by bracket 28 on a fixed part 30 of the radiator shutter frame. As shown more clearly in Figure 2, the reciprocable rod 32 which protrudes from the upper end of the unit 26 is connected by lever arms 34 to pivoted bell crank levers 36 which operate through suitable cross bars 38 to rotate the vanes 14 on vertical axes. In Figure 1 I have also shown a unitary thermostatic control device 40, mounted between the core and pump, the details of which will be hereinafter described.

Figure 3 shows the internal construction of the unit 26 comprising the operating means for the rod 32. The casing includes a cylinder 42 having a closure 44 at the lower end and a closure 46 at the upper end of the cylinder which is removably secured thereto. The closure 46 forms a guide bearing 48 for the rod 32 and is provided with suitable packing 50 to prevent leakage, which is tightly held by a removable threaded stud 52.

The chamber within the cylinder 42 is divided by a piston 54 into a lower pressure chamber 56 and an upper reserve chamber 58. The movable piston 54 has a flanged leather seal 55 in order that fluid pressure produced in chamber 56 will tightly seal the piston against the walls of the cylinder and prevent leakage past the piston into the chamber 58. The piston 54 is secured to a depending stem 60 and to the lower end cap 62 of a solenoid 64. The upper end cap 66 of the solenoid is fixed with respect to the upwardly extending pins 68 which are secured to a disk 70 by nuts 72. The disk 70 has a central opening to receive the lower end of the rod 32 which is provided with a stop pin 74 on the lower side of the disk 70.

An annularly flanged spring seat disk 76 bears against the upper ends of the pins 68 through the pressure of a compression spring 78 reacting between the closure 46 at the upper end of the cylinder and the spring seat member 76. It will be apparent that the normal tendency of the spring 78 is to urge the piston 54 to its lowermost position and therefore to pull down the rod 32 to its lowermost position through the engagement of the disk 70 with the stop pin 74.

A second compression spring 80 encompasses the rod 32 and reacts between the spring seat member 76 and a disk 82 held by stop pin 84 to the rod 32. The spring 80 is a pressure limiting spring to prevent injury should the movement of the rod 32 be resisted. It will be understood that fluid pressure produced in chamber 56 tends to move the piston 54 upwardly and will transmit a limited pressure to the rod 32 since upon excessive fluid pressure the spring 80 will yield to permit lost motion between the piston 54 and the rod 32.

The sleeve 60 forms a guide for a movable tubular stem 86 secured to a plunger 88 forming a movable core for the solenoid. The plunger core 88 is held in normal position by a spring 90 surrounding the stem 86 and received within the depending annular portion of the plunger 88. The spring 90 reacts between the plunger 88 and the sleeve 60 which is fixed with respect to the piston 54 and the solenoid. The sleeve 60 is received within an insulating sleeve 92 which in turn is received within an outer metal sleeve 94. The insulating sleeve protrudes at its lower end beyond the metal sleeve 94. All three sleeves 60, 92 and 94 are fixed to move with the piston 54.

The tubular stem 86 has a flow passage 96 therethrough forming a communication between the chambers 58 and 56. The lower end of the sleeve 60 has secured therein a valve seat member 98 and a check valve 100 is supported by a light spring 102 to normally close the passage through the valve seat member and prevent return flow from the chamber 56 to the chamber 58. The movable stem 86 has secured therein a valve seat member 104. A light check valve 106 is received within the stem 86 immediately below the valve seat member 104 and is held against displacement by a stop pin 108. It will be understood that the check valves 106 and 100 may be termed, respectively, "inlet and outlet check valves" with respect to the expansible and reducible pumping chamber 109 between the valves and that reciprocable movement of the plunger 88 with respect to the solenoid will deliver fluid from the chamber 58 into the chamber 56. The solenoid coil 110 upon being energized by an electric current will produce downward movement of the plunger core 88 and discharge fluid from beyond the check valve 106 past the check valve 100 into chamber 56. The return stroke of the plunger coil 88 will be produced by the expansion of the spring 90 and during this stroke the fluid will flow from the chamber 58 into chamber 109 past the check valve 106.

The electrical connections for producing the intermittent energization of the coil 110 will now be described. The current is led in from a suitable source, such as the battery of the vehicle, through the nut and bolt connection 112 which is fixed to the lower closure cap 44 and insulated therefrom by washer 114. The nut and bolt connection 112 serves to retain in place a contact member 116, the yoke arms 118 of which resiliently bear in sliding contact upon the metal sleeve 94. However, as the piston 54 moves upwardly carrying the sleeve 94 with it, the arms 118 will break contact with the metal sleeve 94 and rest upon the insulating sleeve 92, thus breaking the electrical circuit. The current is connected from the metal sleeve 94 by wire 120 to one end of the solenoid coil 110. The wire 120 passes through an insulating member 122. The other end of the electrical coil 110 leads through an insulating piece 124 to a contact member 126 secured to the contact ring 128 which is separated by insulation 130 from the end piece 66 of the solenoid. Secured to the contact ring 128 is a metallic supporting member 132 carrying pins 134 connected by lead springs 136 to pins 138 fixed to an armature 140. The armature is therefore supported for axial movement.

The parts are shown in "rest" position and the armature, which is supported by the leaf springs 136 is in electrical contact with the plunger core 88, the plunger being grounded through the cylinder casing and the frame of the vehicle. Upon completing the electrical circuit outside of the device shown in Figure 3, the plunger will be attracted and drawn into the solenoid coil carrying with it the armature 140. At a predetermined point the armature 140 will contact with the disk 126 which serves as a stop member and the plunger 88 will continue to move for an instant and break contact with the armature thereby breaking the electrical circuit and permitting the plunger to return. When the contact is broken the armature will be quickly returned to its normal position through flexing of the leaf springs 136 while the plunger, due to its greater mass, will have a lower rate of return and the contact will not be re-established until the plunger has completed its full return stroke. As the fuel is pumped from the reserve chamber 58 into the pressure chamber 56, the piston 54 will move, carrying with it the solenoid and the inlet and outlet check valves. At a predetermined point the spring arms 118 will break contact and interrupt the action of the electrical pumping means. Thereupon the spring 78 will act tending to produce the return stroke.

The piston 54 is therefore moved in an upward direction by the fluid pressure developed in chamber 56 until the electrical pumping means is rendered inoperable by the contact arms 118 separating from the contact sleeve 94. It is desired to have a very slow and gradual return of the piston 54 under the influence of the spring 78 and this may be obtained by permitting a very low leakage of the fluid from chamber 56 back into the reserve chamber 58. The check valve 106 will normally remain in open position and therefore it is only necessary to provide a small vent or bleed passage to permit the fluid to leak past the valve 100, such as indicated by the notch 121 cut into valve seat 98 so that the valve 100, when seated by the light spring 102, will not completely prevent return flow of the fluid. It is to be understood, however, that any other form of bleed passage may be used, such as a separate by-pass having a restricted opening between the chambers 56 and 58. The pressure of the spring 78 will therefore return the piston 54 at a rate determined by the return flow of the fluid.

In order to control the action of the electrical pumping means in accordance with temperature conditions in the cooling system of the motor vehicle, I have shown a thermostatic control device. In Figures 1, 4, 5 and 6 a base plate 122 is secured to the top of chamber 124 through which the cooling fluid flows from the bottom of the radiator core towards the engine. The plate 122 has a central opening 126 in communication with a trap chamber 128 formed by an inverted cup-shaped member 130. The chamber 128 will collect and trap air and vapor so that the normal level of the fluid therein may be as shown in Figure 6. Into the chamber 128 and above the normal level of the fluid therein a pair of tungsten contact wires 132—134 extend which are sealed in the glass wall of the cup-shaped member 130. The wires 132—134 connect respectively to contacts 136 and 138 secured to an insulating strap 140 by nuts 142. The insulating strap 140 is held by bracket arms 144. A pair of pins 146 and 148 are threaded into the base plate 122 and secured by nuts 148 which also serve to hold the bracket arms 144. A plate 150 is slidably received by the pins 146—148 and has a central opening 152 seating on the spherical top of the cup-shaped member 130 but separated therefrom by a rubber piece 154 which serves to absorb vibration and prevent breakage of the glass. The ends of the plate 150 are depressed by nuts 156 threaded on to the pins 146 and 148. The bottom of the cup-shaped member 130 is separated from the base plate 122 by a spring-shaped rubber piece 158.

It is to be understood that by tightening or releasing the nuts 156, the cup-shaped member 130 will be urged more tightly upon its seat or released therefrom, the movement being permitted by the rubber piece 158. It is, therefore, possible to secure a very fine vertical adjustment of the cup-shaped member carrying with it the contact members 132—134. The pin 148 is shown to extend through the bottom plate 122 and has secured thereto, by nut 160 at one end, a bi-metallic thermostatic strip 162. At the free end of the thermostatic strip 162 there is adjustably secured an upwardly extending pin 164 which transmits the movement of the thermostatic element 162 to effect closing and opening of the contacts 168—170.

According to one form of my invention the movable vanes of the shutter may be normally held in closed position by the action of the spring 78 urging the piston 54 in a downward direction until limited by the engagement of the sleeve 92 with the head of the bolt and nut connection 112. In this form the contacts 168—170 will be normally biased to open position. Upon running of the engine the temperature of the cooling fluid in the radiator system will rise, and upon reaching a predetermined degree, the expansion of the bi-metallic thermostatic element is sufficient to effect a vertical movement of the pin 164 causing closing of the electrical contacts 168—170 whereupon the electrical pumping device operates and effects the movement of the shutter vanes toward open position. The opening of the shutter vanes admits air to the radiator and effects cooling of the cooling fluid. As the temperature of the cooling fluid is decreased the thermostatic element will contract and when the fluid temperature drops below a predetermined degree, the electrical contacts 168—170 will again be opened to interrupt the circuit of the pumping device. The piston 54 will thereupon begin to slowly return to effect movement of the shutter vanes toward closed position. The closing movement of the vanes will gradually decrease the admission of air to the radiator and consequently cause the temperature of the cooling fluid to rise whereupon the cycle will continue by closure of the electrical contacts and operation of the pumping device.

Under normal operation the shutter vanes will be opened varying amounts for various degrees of atmospheric temperature and under constant atmospheric conditions, the vanes will move between relatively narrow limits.

In extremely hot weather the vanes may be moved to their fully opened positions and continued operation of the pumping device will cause the piston 54 to be moved to the limit of its operating stroke which is permitted by the compression of the limiting spring 80, whereupon the circuit of the pumping device is interrupted by the contact arms 118 disengaging from the sleeve 94. The piston 54 will then begin to slowly return until the contact arms 118 again engage the sleeve 94 to close the electrical circuit and again produce movement of the piston 54 to the limit of its operating stroke. The contacts 168 and 170 will remain closed so long as the cooling fluid remains at a temperature above a predetermined degree and the shutter vanes will remain in full open positions.

During extremely cold weather particles of moisture between the shutter vanes may freeze, causing the vanes to adhere and resist normal opening under the influence of the pumping device. Under such conditions the running of the engine will heat the fluid to effect closing of the contacts 168—170 through the agency of the thermostatic element 162 and thereby start the pumping operation. Due to the resistance offered by the frozen shutters the piston 54 will not be immediately moved but when the pressure in the chamber 56 overcomes the tension of the spring 80, the piston 54 will start its upward movement, compressing the spring 80 without producing movement of the rod 32. The temperature of the cooling fluid during this period increases rapidly and the heated fluid finally melts the ice holding the shutter vanes against movement and when the shutter vanes are free they will be instantly moved to open position by the expansion of spring 80 and thereafter the opening and closing of the shutters is automatically effected by the rise and fall of the cooling fluid temperature, as previously described.

In another embodiment of my invention, which does not require illustration, it may be understood that the shutter vanes may be normally held in open position by the force of spring 78, in which case the contacts in the thermostatic device should be normally biased to closed position whereby, upon starting the engine, the electrical fluid pumping means will be immediately brought into action to close the shutter vanes and expansion of the thermostatic element 162, due to an increase in temperature of the cooling fluid, will serve to open the contacts of the electrical circuit and permit the opening of the shutter vanes under the action of the spring.

An important feature of the thermostatic device consists in the very fine adjustment that can be obtained. For example, the vertical height of the pin 164 may be adjusted by turning the pin with respect to the thermostatic strip 162 to which it is threaded and locking it by nut 166. In addition a very fine adjustment can be obtained by turning nuts 156 which will produce a very slight and gradual adjustment of the contacting wires with relation to the end of the pin 164.

Another embodiment of the thermostatic device is shown in Figure 7 in which an inverted cup-shaped member 172 is seated upon a rubber disk 174 and a base plate 176 to which is secured, by a pair of screws 178 and a metal plate 180 which has a central opening 182 to receive the cup-shaped member 172 and bears against the annular flange 184 of the cup-shaped member through a washer 186. A similar fine adjustment can be obtained with this form.

The circuit connections are diagrammatically illustrated in Figure 8. In this figure the plunger 88 is shown to be grounded at 190. The armature 140 is normally in contact with the plunger and the current is conducted through the leaf spring arm 136 and the support 132 to the coil 110. The current is conducted from the coil 110 to a ground 192 through a battery 194 and several circuit controlling contacts 196, 198 and 200. 196 may be the circuit controlling connection consisting of the arms 118 normally in contact with the sleeve 94 and separated therefrom when the piston 54 has moved to its extreme upward position. The circuit controlling connection 198 may be the thermostatically-controlled connection, such as illustrated in Figures 4, 5 and 6, and the circuit controlling connection 200 may be the usual ignition switch of the vehicle, whereby, when the ignition switch is open, the system will be inoperative.

I claim:

1. Controlling mechanism for a radiator shutter of a motor vehicle comprising a fixed cylinder, a piston movable in said cylinder, dividing said cylinder into a fluid reserve chamber and a fluid pressure chamber, means connecting said piston to said shutter, pumping means for delivering fluid from said reserve chamber into said pressure chamber to move said piston and shutter in one direction, resilient means for returning said piston and said shutter in the opposite direction and means restricting the return flow of the fluid from the pressure chamber to the reserve chamber to permit a slow return movement of said piston under the action of said resilient means.

2. Controlling mechanism for a radiator shutter of a motor vehicle comprising a cylinder, a piston slidable in said cylinder, dividing said cylinder into a fluid reserve chamber and a fluid pressure chamber, a compression spring within said cylinder reacting upon said piston to normally hold said piston in position for minimum capacity of said pressure chamber, a resiliently limited lost motion connection between said piston and said shutter, electrically operable fluid pumping means for delivering the fluid from said reserve chamber into said pressure chamber to produce movement of said piston in one direction and transmit a limited pressure tending to move said shutter in one direction, said shutter being returned by the expansion of said spring as the fluid is permitted to return from the pressure chamber to the reserve chamber.

3. A thermostatic control for a radiator shutter comprising a dome-shaped chamber open at the bottom to receive fluid from the radiator cooling system whereby air is trapped at the top of said chamber, electrical contacts in the air space of said chamber and a thermostatic element in contact with the cooling fluid adapted to control the opening and closing of said contacts.

4. A thermostatic control for a radiator shutter comprising a dome-shaped chamber open at the bottom and secured in sealing relation to the radiator cooling system whereby fluid from the cooling system may flow into the bottom of said chamber and air will be trapped at the top of said chamber, electrical contact members extending in sealing relation into the top part of said chamber and a thermostatic element in contact with the cooling fluid adapted upon expansion and contraction to control the opening and closing of said contacts.

5. In association with the cooling system of a motor vehicle, a fixed frame having an opening through which fluid may flow from the cooling system, an inverted cup-shaped member fixedly secured to said frame above said opening, contact members extending into the top part of said cup-shaped member and an expansible and contractible thermostatic element supported by said frame below said cup-shaped member and adapted to control the opening and closing of said contacts.

6. A controlling unit for use in connection with motor vehicles comprising, a cylinder, a piston slidable in said cylinder and dividing said cylinder into a fluid reserve chamber and a fluid pressure chamber, an actuating element projecting from the end of the cylinder containing the fluid reserve chamber and connected within said cylinder to said piston, fluid pumping means carried by and movable with said piston for delivering fluid from said reserve chamber to said pressure chamber, means permitting a slow return flow of the fluid from the pressure chamber to the reserve chamber and resilient means within said cylinder for producing the return movement of said piston.

7. An electrically-operated control unit for use in association with a motor vehicle comprising, a cylinder, a piston slidable in said cylinder and dividing said cylinder into a fluid reserve chamber at one end and a fluid pressure chamber at the other end, an actuating element slidably received in the end of the cylinder adjacent the fluid reserve chamber, connections within said cylinder between said actuating element and said piston, electrically operable fluid pumping means carried by and movable with said piston for delivering fluid from said reserve chamber to said pressure chamber to produce movement of said actuating element of said piston and said actuating element in one direction and resilient means for producing the return movement of said piston and said actuating element as the fluid leaks back from the pressure chamber to the reserve chamber.

8. In a device for controlling the movement of a radiator shutter, a casing containing fluid, an operating member for the shutter extending into said casing, a piston slidable in said casing, a connection in said casing between said piston and said operating member to move said operating member in at least one direction, resilient means for moving said piston in said casing in a direction to produce movement of said operating member and means for pumping the fluid within said casing through said piston to produce movement of said piston against the force of said resilient means.

9. In a device for controlling the movement of a radiator shutter, a casing containing fluid, a shutter control rod extending into said casing through one end thereof, a piston slidable in said casing, resilient means within said casing normally holding said piston at one limit of its movement in said casing, a lost motion connection between said piston and said rod for moving said rod when said piston is moved by said resilient means, and means within said casing for pumping fluid through said piston whereby said piston is moved by fluid pressure in a direction against the resistance of said resilient means.

10. In a system for controlling the movement of a radiator shutter, a cylinder, a piston in said cylinder connected to actuate said radiator shutter, a fluid reservoir, means for pumping fluid from said fluid reservoir to produce fluid pressure acting upon said piston to move said piston in one direction in said cylinder and means permitting a slow return movement of the fluid to said reservoir.

11. Controlling mechanism for a radiator shutter of a motor vehicle comprising a cylinder, a piston in said cylinder connected to move said shutter, a fluid reservoir, fluid pumping means for moving said fluid to develop fluid pressure upon said piston to move said piston in one direction, resilient means for moving the piston in the opposite direction and bleeding means for permitting a slow return of the fluid to the fluid reservoir whereby the piston is returned by the force of said resilient means as the fluid pressure upon the piston is slowly diminished.

12. Controlling mechanism for a radiator shutter of a motor vehicle comprising a cylinder, a piston connected to move said shutter, said cylinder forming a fluid reservoir at one end thereof, fluid pumping means in said cylinder for moving fluid from said fluid reservoir through said piston to develop fluid pressure upon said piston on the side opposite the fluid reservoir whereby said piston is moved in one direction, resilient means in said fluid reservoir acting upon said piston to move said piston in the opposite direction and bleeding means for permitting a slow return of the fluid to the fluid reservoir whereby the piston is moved by said resilient means at a slow rate as the fluid pressure on said piston is diminished.

Signed at Chicago, Illinois, this 17th day of July, 1931.

JOHN B. WHITTED.